United States Patent [19]
Turnbull et al.

[11] Patent Number: 5,948,513
[45] Date of Patent: Sep. 7, 1999

[54] LAMINATED FILMS

[75] Inventors: William John Turnbull, Wellington; Gary David Grant, Auckland, both of New Zealand

[73] Assignee: Cryovac, Inc., Duncan, S.C.

[21] Appl. No.: 08/262,199

[22] Filed: Jun. 20, 1994

[30] Foreign Application Priority Data

Jun. 21, 1993 [NZ] New Zealand .............. 247940

[51] Int. Cl.⁶ .............. B65B 53/02; B32B 27/06
[52] U.S. Cl. .............. 428/201; 428/339; 428/516; 428/518; 428/520; 428/910; 428/34.9
[58] Field of Search .............. 428/34.9, 516, 428/518, 520, 220, 195, 332, 337, 339, 201, 910

[56] References Cited

U.S. PATENT DOCUMENTS

| | | | |
|---|---|---|---|
| 3,681,105 | 8/1972 | Cutakovie et al. | 117/15 |
| 3,754,063 | 8/1973 | Schirmer | 264/22 |
| 3,767,500 | 10/1973 | Tally et al. | 156/184 |
| 4,120,716 | 10/1978 | Bonet | 156/272 |
| 4,457,960 | 7/1984 | Newsome | 428/35 |
| 4,484,971 | 11/1984 | Wang | 156/244 |
| 4,495,249 | 1/1985 | Ohya et al. | 428/516 |
| 4,724,185 | 2/1988 | Shah | 428/339 |
| 4,729,926 | 3/1988 | Koteles et al. | 428/474 |
| 4,764,028 | 8/1988 | Wood et al. | 383/20 |
| 4,820,557 | 4/1989 | Warren | 428/34.9 |
| 4,995,927 | 2/1991 | Garrett | 156/152 |
| 5,004,647 | 4/1991 | Shah | 428/349 |
| 5,114,763 | 5/1992 | Brant et al. | 428/516 |
| 5,200,123 | 4/1993 | Crass | 264/22 |
| 5,208,076 | 5/1993 | Wood | 427/428 |
| 5,248,547 | 9/1993 | Wilson | 428/516 |
| 5,283,128 | 2/1994 | Wilhoit | 428/514 |
| 5,334,428 | 8/1994 | Debreski et al. | 428/34.9 |
| 5,344,714 | 9/1994 | Su | 428/516 |
| 5,374,459 | 12/1994 | Mumpower et al. | 428/36 |

FOREIGN PATENT DOCUMENTS

| | | |
|---|---|---|
| B-57956/90 | 6/1990 | Australia . |
| B-20447/92 | 7/1992 | Australia . |
| 56-115291 | 9/1981 | Japan . |
| WO 93/14928 | 8/1993 | WIPO . |

OTHER PUBLICATIONS

Guide to Corona Film Trea Modern Plastics, May, 1961.

*Primary Examiner*—Rena L. Dye
*Attorney, Agent, or Firm*—Mark B. Quatt

[57] ABSTRACT

The invention provides a heat-shrinkable thermoplastics packaging film comprising a laminate of two or more individual heat-shrinkable thermoplastics packaging films, where each of the individual films is substantially identical in composition and layer construction. The films are preferably prepared from double wound film, especially biaxially oriented film comprising LLDPE. The invention also provides a process of preparing such a film, comprising: a) providing two layers of heat-shrinkable thermoplastics packaging film, namely a first layer and a second layer, each of the first and second layers having inner and outer surfaces, the inner surfaces being adjacent to each other; b) treating the outer surface of the first layer to enable the first layer to adhere to the second layer; and c) winding the two layers together into a roll, such that the treated outer surface of the first layer adheres to the outer surface of the second layer to form a laminate. The laminated films of the invention have good strength as well as being advantageously thin.

7 Claims, 2 Drawing Sheets

LAMINATED FILMS

FIELD OF THE INVENTION

This invention relates to a packaging film, and in particular to a laminated film, and to a process for preparing the same.

BACKGROUND OF THE INVENTION

At present, single wound, irradiated polyolefin high shrink film is typically used for packaging, by manual overwrapping, of bone-in frozen or chilled meat cuts, especially pork or lamb cuts. Such films include the Cryovac DL19 film of W R Grace (NZ) Ltd. The overwrapping concept requires operators to use wrapping techniques that provide multiple layers of film to cover the sharp bones of the meat cuts and prevent subsequent film tearing or puncturing during the shrink process and resulting packaging rejection. For applications such as these, a thin high shrink film having good tensile strength would be desirable.

It is an object of the present invention to go some way towards meeting the above desiderata or at least to offer the public a useful choice.

SUMMARY OF THE INVENTION

Accordingly, in a first aspect the present invention consists in a heat-shrinkable thermoplastics packaging film comprising a laminate of two or more individual heat-shrinkable thermoplastics packaging films, wherein each of said individual films is substantially identical in composition and layer construction.

In a preferred embodiment, the laminate comprises two individual films, the films together comprising double wound biaxially oriented film The thickness of each of the individual films is preferably from about 10 to about 30 $\mu$m, more preferably from about 15 to about 25 $\mu$m.

In a preferred embodiment, the individual films contain polyethylene, preferably linear low density polyethylene (LLDPE).

In particularly preferred embodiments, the individual films are selected from the group consisting of:

1) a monolayer comprising LLDPE,
2) a three layered film comprising a core layer comprising LLDPE, and two outside layers each comprising LLDPE containing a slip agent; and
3) a three layered film comprising a core layer comprising LLDPE, and two outside layers each comprising a blend of LLDPE, ethylene vinyl acetate copolymer (EVA), polypropylene and a slip agent.

When the individual film is 1), preferably the thickness of said individual film is from about 15 to about 19 $\mu$m. When the individual film is 2), preferably the thickness of said individual film is about 19 $\mu$m. When the individual film is 3), preferably the thickness of said individual film is from about 19 to about 25 $\mu$m.

The laminate is also preferably printed, and the print is trapped between the individual films of the laminate.

In a further aspect the present invention may broadly be said to consist in a process of preparing a heat shrinkable thermoplastics packaging film, comprising the step of laminating two or more individual heat-shrinkable thermoplastics packaging films, wherein each of said individual films is substantially identical in composition and layer construction.

In preferred embodiments, the laminated film is as described above.

In a further aspect the present invention consists in a process of preparing a laminated heat-shrinkable thermoplastics packaging film, comprising the steps of:

a) providing two layers, each layer comprising an individual heat-shrinkable thermoplastics packaging film, said two layers comprising a first layer and a second layer, each of said first and second layers having inner and outer surfaces, said inner surfaces being adjacent to each other;

b) treating the outer surface of the first layer to enable the first layer to adhere to the second layer; and c) winding the two layers together into a roll, such that the treated outer surface of the first layer adheres to the outer surface of the second layer to form a laminate of the first and second layers.

The layers are preferably wound onto a cylinder, and the process preferably also includes the further step of unwinding the unadhered portion of the first layer from the roll.

In a preferred embodiment the two layers are substantially identical in composition and layer construction and together comprise double wound film. The double wound film preferably comprises biaxially oriented film containing LLDPE, each layer having a thickness of from about 10 to about 30 $\mu$m, more preferably from about 15 to about 25 $\mu$m, and the layers are selected from the group consisting of:

1) a monolayer comprising LLDPE;
2) a three layered film comprising a core layer comprising LLDPE, and two outside layers each comprising LLDPE and containing a slip agent; and
3) a three layered film comprising a core layer comprising LLDPE, and two outside layers each comprising a blend of LLDPE, EVA, polypropylene and a slip agent.

In a preferred embodiment, the laminated film is printed, and the printing and treatment steps are carried out on a printing press, more preferably a central impression drum flexographic printing press.

In one form of the invention, the treatment step (b) comprises applying laminating varnish to the outer surface of the first layer. In this form of the invention, preferably the outer surface of the first layer is printed before the laminating varnish is applied, and the varnish is applied using a full laminating varnish plate.

In an alternative form of the invention, the treatment step (b) comprises flame treatment or electrical discharge treatment. In this form of the invention, preferably the outer surfaces of both of the first and second layers are treated, and the outer surface of the first layer is printed after the treatment has been carried out.

In a further aspect the present invention consists in a heat-shrinkable thermoplastics packaging film comprising a laminate of two or more individual heat-shrinkable thermoplastics packaging films, wherein each of said individual films has a thickness of 25 $\mu$m or less.

In a preferred embodiment the laminate comprises two individual films substantially identical in composition and layer construction, and the films together comprise double wound biaxially oriented film.

Preferably each individual film comprises LLDPE and has a thickness of from 15 to 25 $\mu$m.

In still a further aspect the present invention consists in a process of preparing a heat-shrinkable thermoplastics packaging film, comprising the step of laminating two or more individual heat-shrinkable thermoplastics packaging films, wherein each of said individual films has a thickness of 25 $\mu$m or less.

In a further aspect the present invention consists in a laminated film produced by a process as herein defined.

BRIEF DESCRIPTION OF THE DRAWINGS

Preferred forms of the present invention will now be described in more detail with reference to the accompanying drawings, in which.

DESCRIPTION OF THE PREFERRED EMBODIMENTS

In a preferred form of the invention, the laminated films of the invention are produced from a starting material comprising a double wound, heat shrinkable thermoplastics packaging film. The term "double wound" refers to a film which has been produced from an extruded collapsed film bubble which has had its two edges slit out. The films are preferably of a gauge ranging from about 10 μm to 30 μm, more preferably from 15 to 25 μm. Biaxially oriented films containing LLDPE are particularly suitable. Single layer films and coextruded multi-layered films may all be used.

Examples of preferred films which may be used are (1) the DL19 film of W R Grace (NZ) Ltd, which is an irradiated biaxially oriented film comprising a monolayer of LLDPE, with a gauge of 15 or 19 μm, (2) the MD film of W R Grace & Co-Conn, which is a non-irradiated biaxially oriented three layered structure consisting of a core layer of LTDPE and two outside layers each comprising LLDPE with Slip Masterbatch, with a gauge of 19 μm, and (3) the MR film of W R Grace & Co-Conn, which is an irradiated biaxially oriented three layered structure consisting of a core layer of LLDPE, and balanced inner and outer layers of a blend of LLDPE, EVA, polypropylene and Slip Masterbatch, with a gauge of 19 or 25 μm. The term "Slip Masterbatch" refers to a blend of clays, waxes and slip additives, which imparts antiblock characteristics to the film. Alternative films suitable for use in the present invention are the Cryovac BDF barrier films.

It is preferred that the individual films to be laminated are identical, but laminates produced from different individual films are also within the scope of the invention.

In a preferred form of the invention, the laminates of the present invention are prepared using a printing press, preferably a central impression drum (CI) flexographic printing press. Such printing presses are well known in the art.

Figure 1:
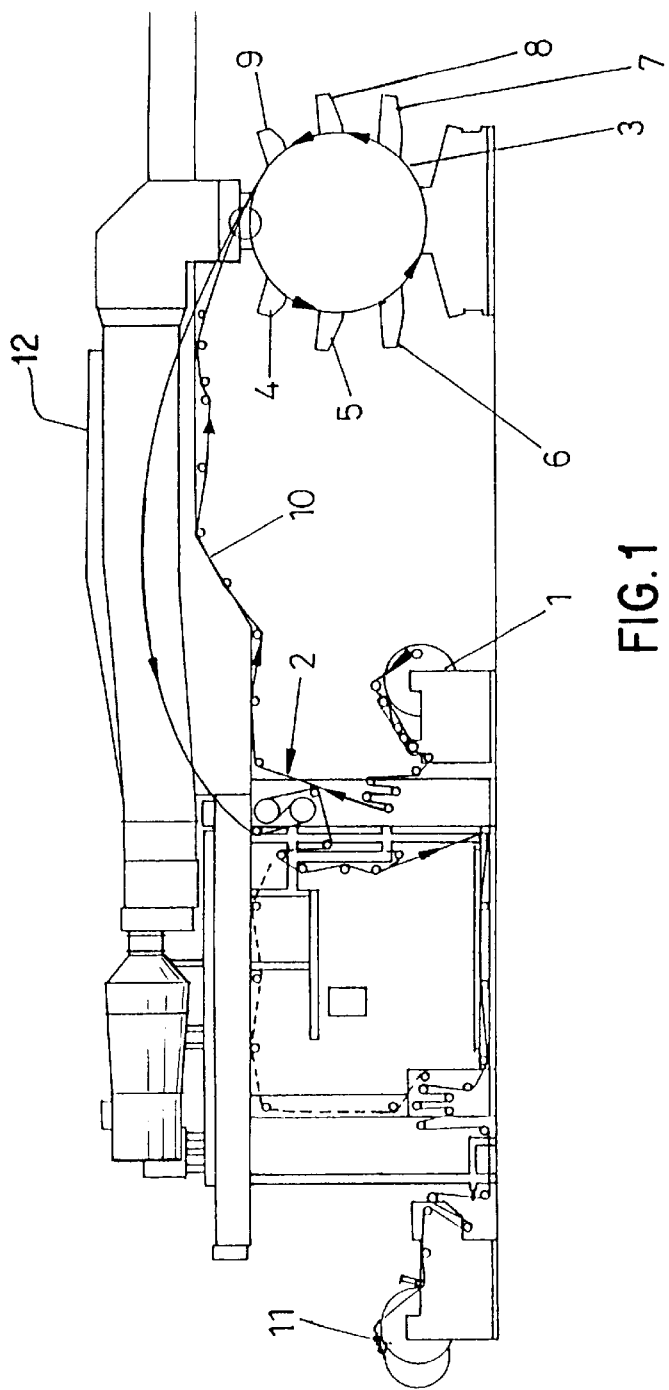
FIG. 1 is a diagrammatic view of a typical central impression drum flexographic printing press, on which the process of the present invention may be carried out, and showing the various stages in the process.

Referring to FIG. 1, a double layer of film 10 is first loaded into an unwind press station 1, and threaded through the press as a double layer in the same manner as single layer material would be processed. The arrows show the direction of the film through the press. At a treatment station 2, the top (outer) surface of the upper layer of material is treated to enable later printing of the surface to be performed. The treatment reduces the surface tension of the film to match it to the surface tension of the inks to be used for printing. Flame treatment is typically the treatment used, but electrical discharge treatment ('Corona' treatment) may also be used. After the surface layer has been treated, the film advances to the drum 3 where printing of the top surface of the upper layer, as desired, is carried out at printing stations 4 to 8 (each of which will comprise a different coloured ink). Preferred inks for use in the invention include the W R Grace & Co-Conn R.D system inks.

Interstation drying is carried out between each print station. Laminating varnish is then applied at station 9, to the top surface of the upper layer of the film, preferably as a complete web overlay. The laminating varnish treatment is the treatment which enables subsequent lamination of the two layers, i.e. it facilitates adhesion of the two layers. A preferred laminating varnish for use in the present invention is a "Morrisons Printing Ink" proprietary ink, code No. WI15437. Other suitable materials will be apparent to those skilled in the art.

The preferred varnish treatment is achieved using a full laminating varnish plate, although grid plates and strip plates may also be used. A "full plate" is a flat plate covering the surface of the plate cylinder (which carries the printing plates), "strip plates" are placed in strips around the plate cylinder, and a "grid plate" is a plate with a raised grid design covering the surface of the plate cylinder.

After the printing and lamination adhesive application processes have been completed, the material travels (still as a double layer with the top surface of the top layer printed and with varnish applied) through the press tunnel 12 (where further drying is carried out) to a press rewind station 11. It is preferred that any reverse angle rollers which will come into contact with the varnish-containing top surface of the top layer, during this process, are covered with a thin layer comprising a teflon coating. This prevents ally adhesion between the varnish and the rollers occurring. The material is then rewound, still as a double layer. The winding up of the material laminates the upper and lower layers together. That is, as the film is wound up, the top (outward-facing) surface of the upper layer will adhere to the bottom (outward facing) surface of the lower layer. This is shown more clearly in FIG. 2A, in which the two layers 20 and 21 are shown, wound up on a roll 24. The treated upper surface of the top layer 20 is indicated by numeral 22 and the continuous wavy line. The arrows show the adhesion between the surfaces.

Figure 2A:
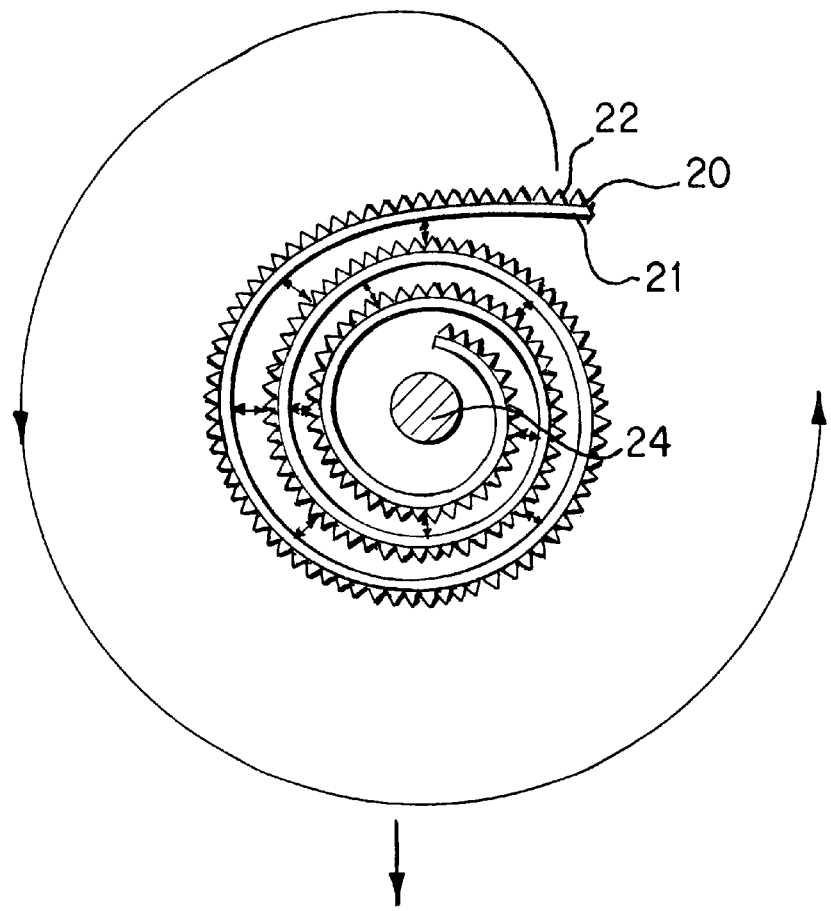
FIGS. 2A and 2B are diagrammatic cross-sections of a roll of wound-up laminate produced according to the process of the present invention, showing the final step in the process in which the top layer of the laminate is unwound back on itself.
Figure 2B:
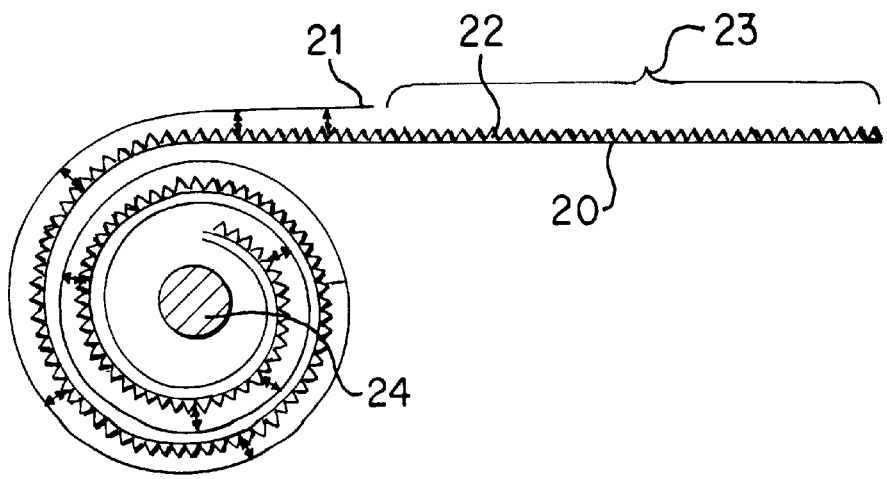

When the material has been wound up, the top layer 20 is wound back on itself, that is, unwound, for nearly one revolution in the direction indicated by the arrow in FIG. 2A. The treated surface of the unwound portion of the top layer 20 will contact the bottom surface of the bottom layer 21 and adhere to it, locking the two layers together as shown in FIG. 2B. The surplus material 23 of the top layer which has no corresponding portion of bottom layer to adhere to, may be slit off if desired. The laminated material is thereby conveniently already wound up and presented ready for use.

In an alternative form of the present invention, laminating varnish is not used. It has been found, for example, that lamination of the DL19 film can be achieved by using only the flame or electrical discharge treatment which is carried out before the printing process. Tile flame or electrical discharge treatment imparts a blocking or bonding characteristic to the DL 19 film. In this form of the invention, the outer surfaces of both the first and second layers will he treated in this manner. This can be achieved by using a 'Corona' press treater, which can treat both film surfaces in one pass before printing. Alternatively, if press flame treatment is used, in which only one surface can be treated with each pass, the film is run through the press twice. The first pass through the press treats one outer surface only. The second pass treats the opposite outer surface. Print is then applied to one outer surface. After the second press pass and rewinding of the material, the treated printed surface is wound back onto the unprinted treated surface (as shown in FIG. 2B), thus laminating the film.

Figure 3:
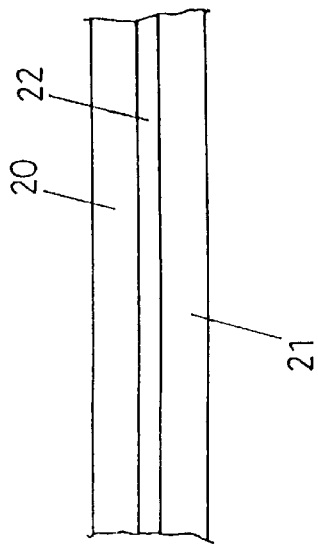
FIG. 3 is a diagrammatic cross section showing the structure of a laminated film of the present invention.

It can be seen that by carrying out the process of the present invention the printed matter will be trapped between the two layers of the laminate. FIG. 3 shows a laminated film according to the present invention, having inner and outer layers 20 and 21 adhered together by a layer of varnish 22.

EXAMPLES

Laminated films were prepared using the process described above. The films and varnish plate used, as well as results of puncture energy tests carried out on the laminated films using an Instron Model 4301 (standard test programme programmed into the machine), are detailed in Table 1 below. The results for the same tests performed on single layer MD and DL19 films are also shown in the table.

TABLE 1

| Sample | Peak Load (kg) | Energy at Test End (gm) | Peak Stress (kg/mm$^2$) | Film Gauge ($\mu$m) |
|---|---|---|---|---|
| MD: full laminating varnish plate | 6.52 | 20.8 | 3.71 | 19/19 |
| MR: full laminating varnish plte | 10.1 | 36.0 | 4.74 | 25/25 |
| MR: grid laminating varnish plate | 7.65 | 24.8 | 4.55 | 19/19 |
| DL19: full laminating varnish plate | 7.94 | 23.3 | 5.04 | 19/19 |
| MD: single layer | 3.21 | 10.9 | 4.04 | 19 |
| DL19: single layer | 4.76 | 12.5 | 6.02 | 19 |

As can be seen from the results in Table 1 the double layer films were approximately twice as strong as the corresponding single layer films.

In an alternative form of the invention, a single layer of film only may be loaded into the unwind press station 1, and subjected to the treatment, printing and laminating varnish application processes described above. The second layer of film may then be introduced after the first layer has emerged from the press tunnel 12, and directly laminated onto the first layer.

The laminated films of the present invention offer a number of advantages. First a laminate of two films of for example 19 $\mu$m thickness each, will be considerably stronger than a single, i.e. non-laminated, film of 38 $\mu$m. Thus, the present invention provides heat-shrinkable laminated films of improved strength, which are still acceptably thin. The trapping of the print between the two layers of the laminate also avoids the problem of damage caused to printed labels as frozen cuts move against adjacent cuts in a carton of packaged cuts.

Also, as will he apparent from the foregoing description, in a preferred embodiment of the invention, the films of the present invention are prepared by the efficient process of simply extruding or coextruding a single monolayer or multilayer material, which is then slit and double wound in preparation for the lamination process described above.

The laminated films of the present invention may also allow the use of a wide range of semi-automatic and automatic equipment for packaging bone-in meat cuts. For example, a pillow pack (horizontal form, fill and seal) could be used. The preferred sealing or closure method for such applications would be the trim-sealing of the film.

Although the invention has been described with reference to a particular embodiment, other variations and modifications will be apparent to a person skilled in the art without departing from the scope of the invention as defined in the following claims.

What we claim is:

1. A heat shrinkable thermoplastic packaging film comprising a laminate of two or more individual heat-shrinkable thermoplastic packaging films, wherein each of said individual films is selected from the group consisting of:

1) a monolayer film comprising LLDPE;
   2) a three layered film comprising a core layer comprising LLDPE, and two outside layers each comprising LLDPE and containing a slip agent; and
   3) a three layered film comprising a core layer comprising LLDPE, and two outside layers each comprising a blend of LLDPE, EVA, polypropylene, and a slip agent.

2. A film as claimed in claim 1 comprising a laminate of two identical films, wherein said films together comprise double wound biaxially oriented film.

3. The film as claimed in claim 1 wherein the thickness of each of said individual films is from about 10 to about 30 $\mu$m.

4. A film as claimed in claim 1, wherein each individual film is a monolayer film comprising LLDPE, and having a thickness of from about 15 to about 19 $\mu$m.

5. A film as claimed in claim 1 wherein print is trapped between two individual films.

6. A film as claimed in claim 1 wherein each individual film has a thickness of from 15 to 25 $\mu$m.

7. A film as claimed in claim 1, wherein each of the individual films is substantially identical in composition and layer construction.

* * * * *